(12) United States Patent
Martindale

(10) Patent No.: US 6,503,354 B1
(45) Date of Patent: Jan. 7, 2003

(54) SYSTEM AND METHOD FOR REDUCING BLISTERING IN AUTOMOBILE RACING TIRES

(76) Inventor: Jonathan Martindale, 12150 Baker Hollow Rd., Columbus, IN (US) 47201

( * ) Notice: Subject to any disclaimer, the term of this patent is extended or adjusted under 35 U.S.C. 154(b) by 0 days.

(21) Appl. No.: 09/439,855

(22) Filed: Nov. 12, 1999

(51) Int. Cl.⁷ ..................... B29D 30/68; B60C 11/117; B60C 109/00
(52) U.S. Cl. .............................. 156/110.1; 152/209.17; 157/13; 156/394.1; 156/421.6
(58) Field of Search .......................... 152/209.18, 209, 152/17, DIG. 3; 157/13; 83/866, 868; 156/110.1, 394.1, 421.6

(56) References Cited

U.S. PATENT DOCUMENTS

| | | | |
|---|---|---|---|
| 1,335,124 A | * 3/1920 | Midgley | |
| 2,504,090 A | * 4/1950 | Sanderson | 152/209.17 |
| 2,570,540 A | * 10/1951 | Furnald | 157/13 |
| 2,623,591 A | * 12/1952 | Furnald | 157/13 |
| 2,734,568 A | * 2/1956 | Anderson | |
| 2,968,344 A | * 1/1961 | Kuts et al. | 157/13 |
| 3,154,985 A | * 11/1964 | Hermanns | |
| 3,409,064 A | * 11/1968 | Leonard | 152/209.17 |
| 3,645,313 A | * 2/1972 | Roberts et al. | 152/209.17 |
| 3,661,668 A | 5/1972 | Gallagher | |
| 3,675,520 A | * 7/1972 | Klose | 157/13 |
| 4,019,234 A | 4/1977 | Jensen et al. | |
| 4,619,301 A | 10/1986 | Hiroki | |
| 5,047,110 A | 9/1991 | Bryant et al. | |
| 5,221,382 A | 6/1993 | Sid-Ahmed | |
| 5,316,063 A | 5/1994 | Lagnier | |
| 5,456,301 A | 10/1995 | Wise | |
| 5,800,649 A | 9/1998 | Eromaki | |
| 5,871,598 A | 2/1999 | Tomita | |

FOREIGN PATENT DOCUMENTS

| | | | | |
|---|---|---|---|---|
| EP | 91418 | * | 10/1983 | 152/209.17 |
| JP | 58-194605 | * | 11/1983 | 152/209.18 |
| JP | 3-208705 | * | 9/1991 | 152/209.17 |

* cited by examiner

Primary Examiner—Steven D. Maki
(74) Attorney, Agent, or Firm—Baker & Daniels

(57) ABSTRACT

A device and technique for processing tires on site includes penetrating the tire with an array of spikes to provide a multiplicity of pinholes dispersed about the tread surface. The pinholes, thereby eliminating the risk of blisters. The size and quantity of the pinholes is calibrated to provide a path for the escape of gas entrapped in the tire material during the manufacturing process, without significantly affecting the performance of strength of the tire. The pattern of pinholes provides a ready path for gas to escape as the tire is heated during use, without the risk of blistering that plagues the typical racing tire. In one embodiment of the invention, the tire is rotatably supported to contact a tire preparation element that includes a plurality of spikes configured to smoothly penetrate the tire rubber. In one feature, the spikes can be heated to facilitate penetration of the tire material, particularly high durometer materials. A drive roller, having a manual crank, can also be provided that frictionally engages the tire to rotate the tire by manipulation of the crank. In another embodiment, a plate is provided onto which the tire can be rolled or driven. The plate includes a multiplicity of spikes projecting upward therefrom, each spike configured to penetrate the tire material.

17 Claims, 3 Drawing Sheets

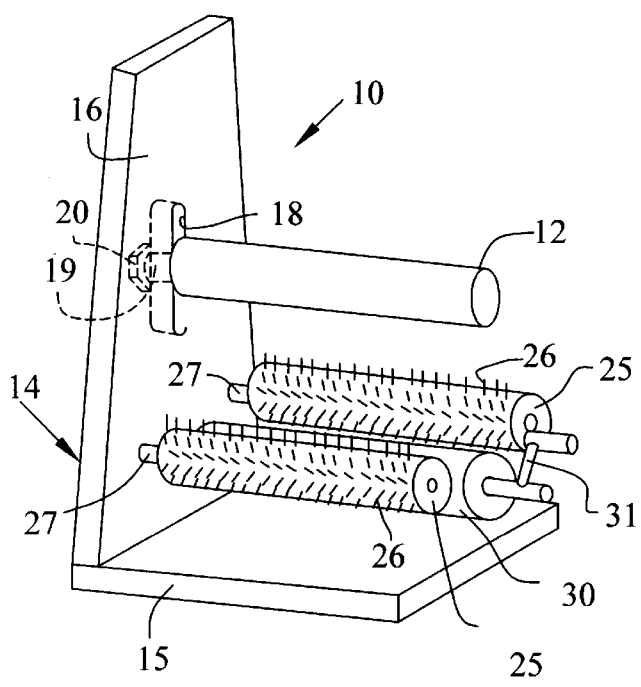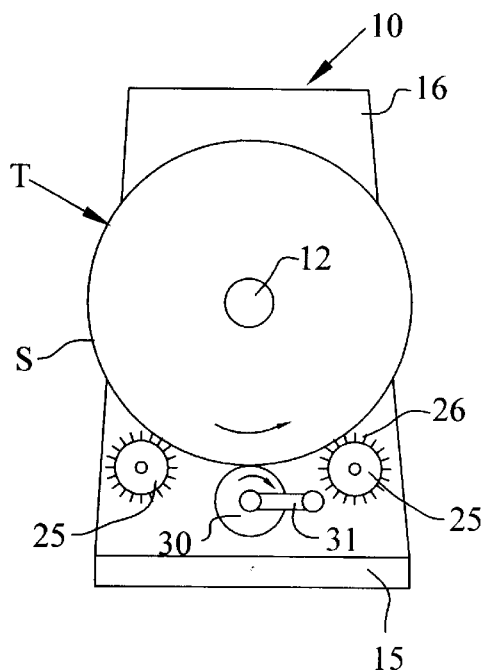
FIG. 1
FIG. 2
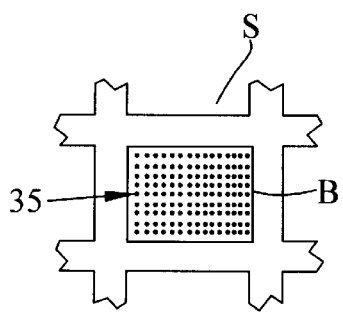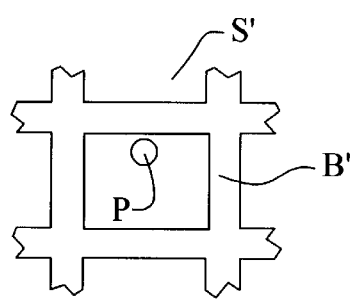
FIG. 3
FIG. 4
PRIOR ART

SYSTEM AND METHOD FOR REDUCING BLISTERING IN AUTOMOBILE RACING TIRES

BACKGROUND OF THE INVENTION

The present invention concerns the reduction of the blister phenomenon that occurs in automotive tires, particularly in automobile racing tires. More particularly, the invention presents a system and method for preparing a racing tire to prevent the occurrence of blistering.

The typical automotive tire is formed of galvanized rubber. During the molding of the tire, air or other compressible gases frequently become trapped within the rubber. Moreover, in tires utilizing reinforcing plies, gas can become trapped between layers of material in the tire.

During the manufacture of the tire, the heat and pressure of the vulcanization process can cause the gas to expand within the rubber. This expansion may be sufficiently strong to separate layers of the tire, or result in blisters, either internally or on the surface of the tire. It can be readily appreciated that these blisters represent a weak area in the tire that is susceptible to failure during use. For instance, tires with defects of this nature are more susceptible to chunking, in which pieces of the tread are torn out of the tire. This problem is particularly acute with racing tires. Not only does the chunking effect disrupt the effectiveness of the tire, it can also make the tire more susceptible to blowouts while the racing vehicle is being operated at high speeds.

Many tire manufacturing processes have been developed to reduce the quantity of gas trapped within the tire rubber. The cost many of these processes are prohibitive. Moreover, no known system is 100% effective. Thus, most tires include some volume of gas retained within the tire. In many cases, unless a defect arises during the manufacturing process, the gas retained within the body of the tire will go unnoticed and will usually cause no significant problems.

However, in the field of automobile racing, the typical racing tire is exposed to significant temperatures and loads during a race. Blisters and chunking occur with regularity in racing tires of all types. Asphalt tires typically have a fairly high durometer, ranging between 100–150. Even with this high degree of hardness, the extreme heat increases the risk of blistering. As the racing tires subjected to the high temperatures and loads, the entrapped gas tends to migrate outward through the tire material. Once it reaches the surface or tread of the tire, the entrapped gas manifests itself as a blister. This blister can cause create a tire vibration, cause the tire to loose traction, or lead to the destruction of the tire.

The same phenomenon occurs in dirt track racing tires. These tires generally run cooler than asphalt tires. However, dirt track tires are considerably softer than asphalt tires, having a durometer ranging between 30–80. Thus, the combination of heat, load and a softer tire result in the same gas migration and blistering problem as experienced by the asphalt racing tires.

Thus far, there are no known systems or techniques that reduce the risk of tire blistering due to gases trapped within the tire material. Instead, most of the development in the field of racing tires has been to reduce the temperature of the tire or to manipulate the tread pattern to minimize the likelihood of the chunking phenomenon. In the latter case, varieties of tread block designs have been developed, with varying degrees of success in reducing chunking. However, none of the tread design approaches eliminates the problem of gas entrapped within the tire material.

In the realm of cooling the tire, one well known approach has been to form or remove a large diameter plug from within each tread block of the tire. The theory behind this approach is that the plug hole provides a path for conducting heat from the interior of the tire. In addition, the plug holes provide increased surface area for heat dissipation. This approach has found little success for asphalt racing tires, and has thus been generally limited to dirt track tires. However, due to the soft nature of the tire, the excessive size of the plug holes tends to distort the tread block when the weight of the car is applied at that location. This results in undue distortion of the tire at the tread block, which can ulitimately increases the risk of chunking.

In another approach, a tool, such as a sharpened socket or tire sipe, is used to cut a pattern into the tire tread. Significant problems arise with this approach, since the tool would frequently cut too deeply into the tire. Thus, many tires processed in this way became unbalanced, flatted or self-destructed due to separation of the tire cords or core from the tread blocks.

There remains a significant need in the field of automotive tires, particularly racing tires, for a system and technique to reduce blistering. The need is particularly great for a system and method to account for gas trapped within the tire rubber.

SUMMARY OF THE INVENTION

The invention contemplates a device and technique for processing tires that provides an escape path for gas trapped within the tire during the manufacturing process. In one aspect of the invention, the tire is penetrated by a multiplicity of pinholes dispersed about the tread surface. The pinholes are sufficiently shallow so as not to disturb the integrity of the tire. Moreover, the diameter of the holes is very small so hundreds or thousands of pinholes can be provided around the circumference of the tire without significantly affecting the surface area of the tire tread and gripping surface.

The pattern of pinholes provides a ready path for gas to escape from the tire. Thus, as the tire is heated during use, such as racing, gas entrapped within the body of the tire gradually migrates radially outward as a gas bubble. As the bubble approaches the tread surface, it contacts a plurality of pinholes and gradually dissipates through these holes to exit the tire. The pinholes are thus sized to effectively allow passage of a gas bubble therethrough.

The present invention contemplates a device for preparing a tire, such as a racing tire, on-site. In one embodiment, a support frame is configured to rotatably support a vehicle tire. A tire preparation element is provided that includes a plurality of spikes or pins configured to smoothly penetrate the tire rubber. In one feature, the spikes can be heated to facilitate penetration of the tire material, particularly high durometer materials.

In one embodiment, the tire preparation element includes at least one, and preferably, two drums rotatably supported on the frame. An array of spikes project radially outward from each drum. In one specific embodiment, the drums are spaced apart to support the tire in a vertical orientation. In this specific embodiment, the weight of the tire drives the tire down onto the spikes. The tire can be manually rotated, or one of the spiked drums can be rotated to thereby rotate the tire.

In another specific embodiment, means for rotating the tire is provided. In one form, this means includes a drive roller that frictionally engages the tire. The drive roller can be provided with a manual crank to rotate the roller and thereby rotate the tire. As the tire rotates, pinholes are formed in the tread surface by the spiked drum(s). In one version of this embodiment, the drive roller is disposed between two spiked drums. In another version, a spiked drum and the drive roller are disposed apart to support the tire in a vertical orientation.

In certain embodiments of the invention, an axle is connected to the support frame and configured to rotatably support the tire. The position of the axle can be adjusted to accommodate different radius tires and to maintain adequate pressure between the tire and the spiked drum(s). In the preferred embodiment, the tire is mounted vertically on the device so gravity assists in maintaining the adequate. Alternatively, the support frame can allow the tire to be mounted horizontally, provided the spikes of the drum can fully penetrate tread surface.

In another embodiment of the invention, a plate is provided onto which the tire can be rolled or driven. The plate includes a multiplicity of spikes projecting upward therefrom, each spike configured to penetrate the tire material. In one aspect of this embodiment, the array of spikes has a width approximating the width of the tire and a length corresponding to the circumference of the tire. Thus, pinholes can be created around the entire tread surface of the tire by one pass of the tire over the support plate. In one specific embodiment, the support plate can be hinged so it can be folded up when not in use.

In certain embodiments of the invention, the spikes or pins can be heated to facilitate penetration of the tire material. Thus, in one embodiment, the spiked drums can be heated. In another embodiment, a heating element can be mounted within the support plate. In this embodiment, the heating element can be in conductive contact with the plurality of spikes so that each spike is individually heated.

One benefit of the present invention is that the array of pinholes within the tire provide an escape for virtually all gas trapped within the tire during manufacture. Another benefit is that the gas escape paths are provided without compromising the strength, integrity or performance of the tire, even during the high load and temperature environment of asphalt or dirt racing.

Yet another benefit resides in features of the invention that make the device for preparing tires portable and easy to use on-site. Thus, the present invention provides a device that can be used to prepare any tire from any source.

One object of the invention is to provide an automotive and racing tire that is less susceptible to blistering and virtually immune to the problems normally associated with gas entrapped within the tire material. Another object is achieved by features of the invention that make it readily adaptable as a portable device or as an initial manufacturing process.

Other objects and benefits of the present invention will become apparent from the following written description and accompanying figures.

DESCRIPTION OF THE FIGURES

FIG. 1 is a side perspective view of a tire preparation device in accordance with one embodiment of the present invention.

FIG. 2 is an end elevational view of the tire preparation device shown in FIG. 1.

FIG. 3 is an enlarged plan view of a tread block of a tire prepared using the device depicted in FIGS. 1 and 2.

FIG. 4 is a partial plan view of a tire prepared according to a prior art approach.

DESCRIPTION OF THE PREFERRED EMBODIMENTS

Figure 5:
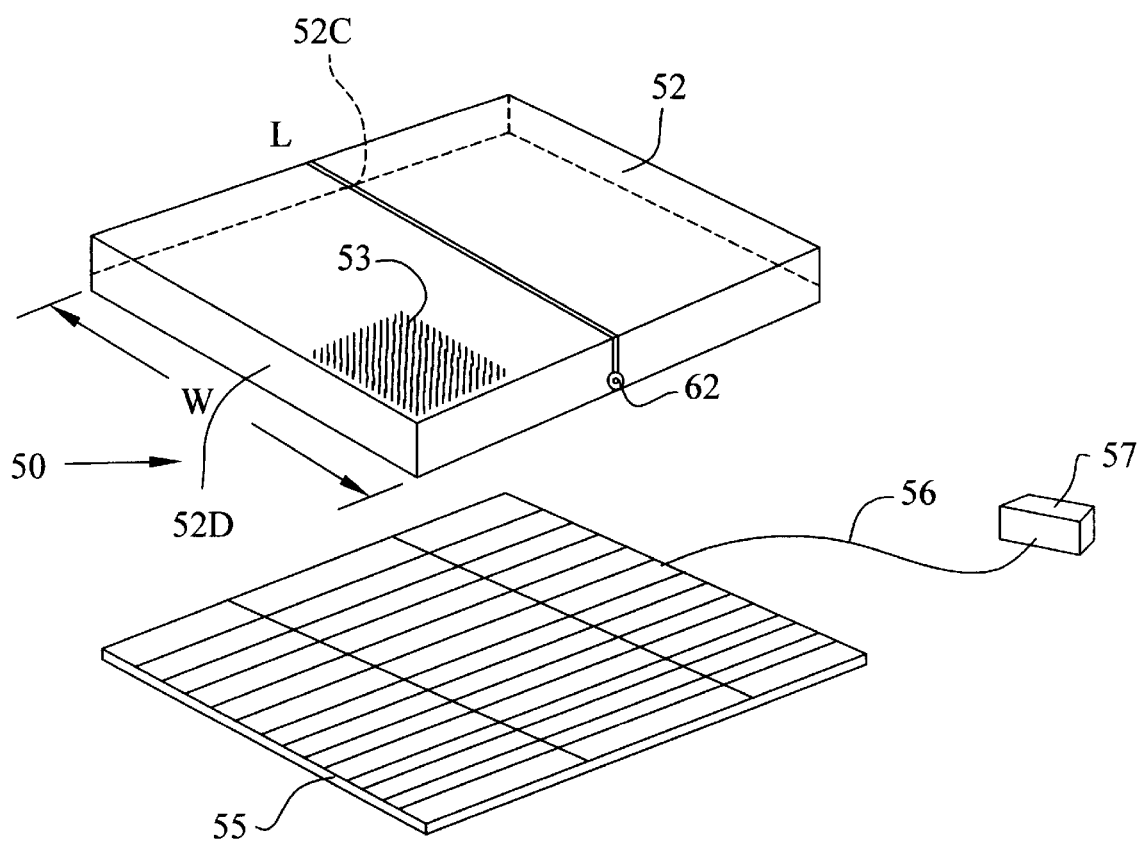
FIG. 5 is a top perspective exploded view of a tire preparation device according to a further embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention contemplates a system and method for reducing the likelihood of blistering in an automobile tire, particularly a racing tire. The invention substantially reduces or eliminates the onset of tire blistering due to the migration of gases trapped within the tire during the manufacturing process. The invention contemplates forming a large number of pinholes in the tread surface of the tire. The pinholes are sufficiently numerous and adequately dispersed or broadcast throughout the surface of the tire so that nearly all gases trapped within the tire have a clear flow path to escape the tire material.

In one embodiment of the invention, a tire preparation device 10 is depicted in FIG. 1. The device 10 includes a support axle 12 that is mounted on a support frame 14. The frame includes a base 15 and a vertical plate 16 attached thereto. The support axle 12 is configured to support a racing tire, such as the tire T depicted in FIG. 2. It is understood that the axle 12 can be configured as necessary to allow mounting of the tire T for rotation relative to the support frame 14.

The support frame 14 is preferably formed of a heavy duty metal, such as steel. The base 15 of the frame is preferably wide and long enough to provide a stable support for the device 10 when a tire is mounted on the support axle 12. It is further contemplated that the support frame 14 be mobile so that the device 10 can be carried to a garage or workshop for treatment or preparation of racing tires on the day of a race. The device 10 can be carried with the equipment of the racing team to each racing location so that the tires can be prepared on site.

Preferably, the support axle 12 is adjustably mounted to the vertical plate 16. In one specific embodiment, the plate 16 includes an adjustment slot 18 through which a treaded post 19 of the support axle 12 extends. A nut 20 can engage the treaded post at the opposite face of the vertical plate 16. It is understood that the adjustable feature provided by the slot, post and nut must be sufficiently strong so that the axle 12 does not slip when the tire T is rotatably supported thereon.

According to the present invention, a tire preparation element 25 is provided that creates numerous pinholes in the tread surface S of the racing tire T. In the embodiment illustrated in FIGS. 1 and 2, the tire preparation element 25 constitutes a pair of spiked drums 25. Each of the drums includes a plurality of pins or spikes 26 projecting readily outward therefrom. The drums 25 are preferably mounted to the vertical plate 16 of the support frame 14 by an associated spindle 27. Thus, the spiked drums 25 can be rotated about the spindle and relative to the vertical plate.

As shown in the end view of FIG. 2, the tire T essentially rests directly on each of the spiked drums 25. The vertical position of the support axle 12 can be adjusted so that the tire T is firmly pressed against each of the spiked drums 25 as the tire T is rotated in the direction of the arrow. It is understood that as the tire is rotated, the spikes 26 on each of the drums 25 penetrate the tire to form an array of pinholes. In the preferred embodiment, the drums 25 rotate as the tire T rotates. With this configuration, the spikes 26 smoothly penetrate the tire and are cleanly removed as the tire continues to rotate.

In one specific embodiment of the invention, the support axle 12 and the two spiked drums 25 are the sole means for supporting the tire T. With this embodiment, the tire can be rotated by manual pressure applied to the tire itself. With this approach, the weight of the tire can provide sufficient pressure against the spikes 26 to allow penetration of the tread surface. It is anticipated that this approach may be better used with low durometer dirt track racing tires.

In the preferred embodiment, means are provided for rotating the tire, apart from manually manipulating the tire itself. In this embodiment, the rotation means can include a drive roller 30 that is rotatably mounted to the frame 14, and most specifically to the vertical plate 16. As depicted best in FIG. 2, the drive roller 30 can be situated between the two spiked drums 25. In addition, the axis of rotation of the roller 30 is below the spindles 27 supporting the spiked drums 25. In this way, the tire T can be uniformly supported by the drive roller and the opposing spiked drums 25.

Figure 7:
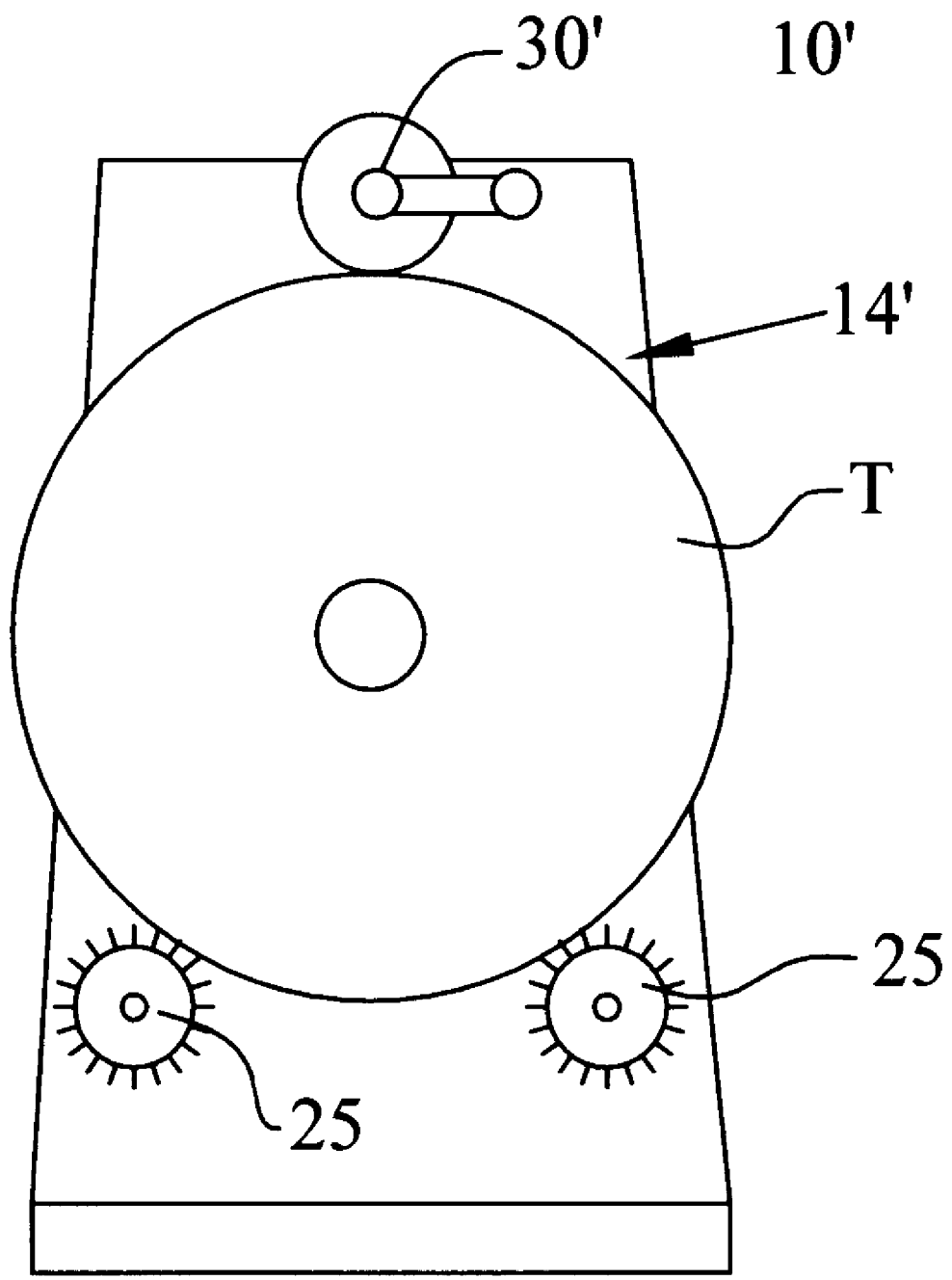
FIG. 7 is an end elevational view of an alternative embodiment of the tire preparation device shown in FIG. 1.

Alternatively, the drive roller, such as roller 30' in FIG. 7, can be situated near the top of the vertical plate of the support frame 16'. In this configuration, the roller can apply a downward force on the tire T as it frictionally rotates the tire. The downward force is strong enough to force the tire onto the spiked drums 25 as the tire is rotated. With this approach, the support axle 12 can be eliminated, since the tire is, in effect, clamped between the lower spiked drums 25 and the upper drive roller 30'. Preferably, the drive roller is adjustably mounted to accommodate different tire radii.

Returning to FIGS. 1 and 2, a crank 31 is connected to the drive roller 30 and configured for manual rotation. Thus, as the crank 31 is rotated, the drive roller 30 rotates in the direction of the arrow shown in FIG. 2, which thereby imparts a rotation to the tire T. Again, it is understood that the support axle 12 and the drive roller 30 must be maintained a sufficient distance apart to accommodate the radius of the tire T and to maintain sufficient driving friction between the tire and the roller.

As a further alternative, only one spiked drum 25 can be included as a tire preparation element. In this instance, the drive roller 30 is preferably moved from the position shown in FIG. 2 to a position that provides sufficient support for the tire T. Thus, in this alternative embodiment, one of the spiked drums 25 can be replaced by the drive roller 30. Three points of contact for the tire T, namely the support axle 12, the drive roller 30 and the spiked drum 25, provide a solid support for the tire as it is rotated and as the spikes 26 of the drum 25 penetrate the tread surface S of the tire.

When a tire T is prepared or processed using the device 10 shown in FIGS. 1 and 2, the tread surface S of the tire takes on the appearance shown in FIG. 3. Specifically, each tread block B on the surface S includes numerous pinholes 35 that have been formed by the spikes 26 of each tire preparation element 25. Each pinhole 35 provides an avenue for gas entrapped within the tire to escape. Moreover, since the pinholes are dimensionally very small, they do not compromise the integrity of the tire or otherwise increase the risk of chunking of the tread block B.

In accordance with the invention, the array of pinholes 35 must still maintain the integrity of the tire. More specifically, each pinhole must not be so large in diameter or in depth as to compromise the tire rubber, the tread surface or a tread block B. Thus, in a specific preferred embodiment, each pin or spike 26 has a diameter of no greater that 0.0625 inches (1.78 mm.). In addition, the spikes are sized to penetrate the tread surface S no more than about 0.20 inches (5.1 mm.). This maximum depth of penetration is acceptable for dirt tires. The depth is preferably 0.125 inches (3.175 mm.) for asphalt racing tires.

In addition to the size limitation for each of the spikes 26, the density of pinholes 35 throughout each tread block B must be calibrated to preserve the integrity of the tire. In one embodiment, the spikes 26 on each spiked drum 25 are spaced along the length of the drum. In a specific embodiment, at least fifty pins are spaced along the length. In addition, at least ten such rows can be spaced around the outer circumference of the spiked drum 25. At the other end of the dimensional spectrum, the density of the pinholes 35 should not exceed about 20% of the surface area of each tread block B, or 20% of the surface area of the tread surface S. The spikes 26 on each drum 25 can be arranged to form a particular pattern. For instance, successive rows of spikes on a given drum can be offset relative to each other along the length of the drum, so that the array of pinholes 35 are in an alternating pattern. Preferably, the spiked drums 25 are synchronized so that pinholes produced by the rows of spikes in one drum do not coincide with the pinholes produced by the other drum. Thus, when two or more spiked drums 25 are utilized, they are preferably geared together to ensure uniformity in the pinhole patterns produces by each and to guarantee rotation in unison.

The tread surface configuration produced by the device 10 of the present invention, as shown in FIG. 3, can be compared against the tread surface configuration for a tire modified according to the prior art approach described in the background. In particular, it can be seen that the tread block B' includes a plug P of material removed from the block. It can first be appreciated that the plug P significantly disrupts the friction surface of the tread block B'. Moreover, the single plug P does not provide a widely dispersed path for gas to escape from the tire material.

A further embodiment of the invention is depicted in FIGS. 5. and 6. In particular, a tire preparation pad 50 is utilized that can be laid out on the ground. The pad is configured so that the vehicle tire can be driven directly onto the pad 50. In one specific embodiment, the pad 50 includes an upper plate 52 having side edges into which is mounted numerous pins or spikes 53 projecting upward therefrom.

In one feature of this embodiment, the pad includes means for heating the spikes 53. In the specific embodiment this means includes a heating element 55 that is disposed within the upper plate 52 and in direct contact with the spikes 53, as shown best in FIG. 6. The heating element 55 can include a power cord 56 to a power source 57 to provide electrical energy to heat the elements. In a specific embodiment, the heating element 55 can include an array of heat generating wires. These wires can be in conductive contact with the spikes 53. In accordance with this embodiment, the heated spikes 53 more easily penetrate the tire material, particularly when the tire is formed of a high durometer rubber.

Figure 6:
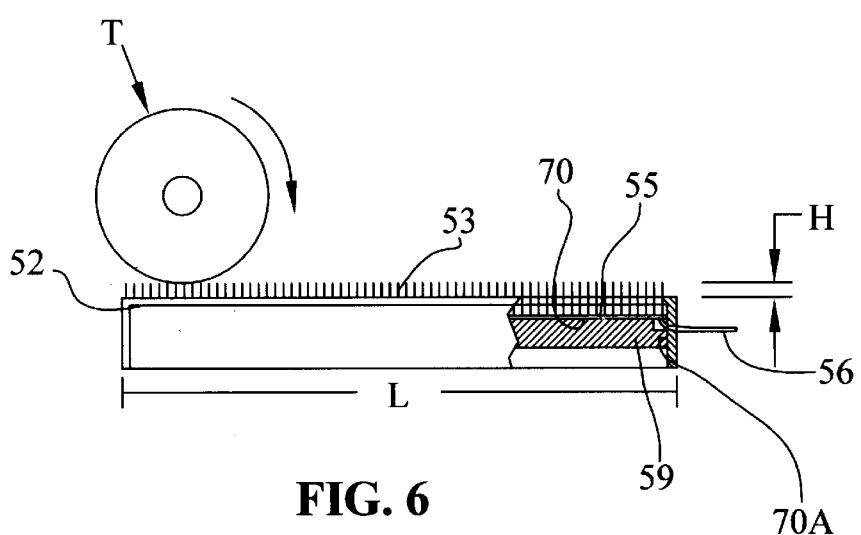
FIG. 6 is side elevational view of the device shown in FIG. 5 in use during the preparation of a racing tire.

A backing plate 59 can be disposed underneath the heating element 55 and within the side edges of the upper plate 52 to provide support for the spikes 53 as the vehicle tire rolls over the spikes. As shown in FIG. 6, the tire T can be rolled directly over the pad 50, so that each of the numerous spikes 53 penetrates the tire. In one specific approach, the tires can be on the racing vehicle itself. Alternatively, the tire can be manually rolled over the pad 50. The use of the heating element 55 means that less downward force needs to be applied for proper penetration of the spikes 53 into the tire material.

In an alternative version of this embodiment, the pad 50 can include a hinge 62 separating the pad into two connected components. With this embodiment, the pad can be folded in half for conveyance and storage.

As with the prior embodiment, the spikes 53 are configured and arranged to create the array of pinholes 35 depicted in FIG. 3. The pad 50 can have a width W that is at least equal to, and preferably larger than, the width of the racing tire. The pad 50 also has a length L that is at least equal to the dimension around the circumference of the tire T. Thus, a tire can be completely perforated by one passage along the pad 50. In the preferred embodiment, the pad 50 includes at least fifty rows of at least fifty spikes per row along the length L of the pad. Each row extends substantially entirely across the width W of the pad. In addition, the spikes 53 project upward from the upper plate 52 a dimension h. This dimension is preferably less than about 0.20 inches for dirt tires and less than about 0.125 inches for asphalt tires.

The present invention-contemplates an automotive tire, particularly a racing tire, having a continuous array of pinholes formed in the tread surface of the tire. The devices shown in FIGS. 1–2 and 5–6 are preferably portable so that the tires can be prepared on site as they are needed. Alternatively, the devices can be utilized at the point of manufacture of the tires. It is further contemplated that the tire molds themselves can incorporate an array of spikes to form the pinholes in the rubber material as it is being formed into the tire itself. It is understood that the tire mold can be readily modified by persons of skill in the art of tire production to incorporate spikes, such as the spikes 26 and 53 of the embodiments of the present invention.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, the spiked drums 25 of the embodiment shown in FIGS. 1 and 2 can be heated, or more specifically, the spikes 26 can be heated. Thus, the device 10 can include a heating element disposed in each spiked drum 25. Alternatively, the drums can be pre-heated before mounting on the support frame 16.

In the illustrated embodiments, the support frame is vertically oriented to support the tire vertically. Alternatively, the frame can be configured to support the tire horizontally. In this instance, pressure must be maintained between the tire and the tire preparation element so the spikes can easily and fully penetrate the tread surface. The requisite pressure can be maintained by adjustability in the position of the drive roller and/or the spiked drums.

In one embodiment, the tire is rotated by operation of a manually cranked drive roller. Alternatively, the drive roller, such as roller 30 of FIG. 2, can be separately powered, such as by an electric motor. Likewise, the spiked drums 25 can be driven, either manually or by a separate motor. Synchronization between the various rotating components of this embodiment can be achieved by gearing.

What is claimed is:

1. A device for preparing the tread surface of a detached racing tire to reduce blistering, the device comprising:
   a frame configured to support a tire for rotation relative to said frame, said frame including a base and a single vertical plate projecting upwardly from said base;
   a tire preparation element supported by said frame for contact with the tire as the tire rotates relative to said frame, said tire preparation element including a plurality of spikes spaced along a dimension substantially equal to the width of the tread surface of the tire, said spikes configured to penetrate the tire as the tire rotates in contact with the tire preparation element; and
   an axle adjustably mounted on and projecting perpendicularly and cantilevered from said single vertical plate of said frame for rotatably supporting the tire in contact with said tire preparation element, said axle capable of being positioned on said single vertical plate such that the tire mounted on said axle may contact and be pressed into said spikes, wherein said single vertical plate defines a vertical slot for receiving said axle so that said axle can be adjustably mounted on said single vertical plate.

2. The device for preparing a racing tire according to claim 1, further comprising:
   rotation means mounted to said vertical plate for rotating the tire relative to said tire preparation element.

3. The device for preparing a racing tire according to claim 2, wherein said rotation means includes a drive roller rotatably projecting from said vertical plate and arranged relative to said tire preparation element to frictionally contact the tire with the tread surface in contact with said spikes.

4. The device for preparing a racing tire according to claim 3, wherein said rotation means further includes a manual crank connected to said drive roller to rotate said roller relative to said frame.

5. The device for preparing a racing tire according to claim 1, wherein said tire preparation element includes at least one drum rotatably projecting from said vertical plate to rotate with the tire in contact thereon, wherein said spikes are mounted on said drum to radially project therefrom.

6. The device for preparing a racing tire according to claim 5, wherein said drum includes at least fifty (50) spikes spaced along a length thereof.

7. The device for preparing a racing tire according to claim 6, wherein said drum has a cylindrical outer surface and includes at least ten (10) rows of said spikes spaced around the circumference of said drum, each of said rows aligned along said length thereof.

8. The device for preparing a racing tire according to claim 5, wherein said tire preparation element includes at least two of said drums rotatably projecting from said vertical plate.

9. The device for preparing a racing tire according to claim 8, wherein said at least two drums are spaced apart to support the tire thereon.

10. The device for preparing a racing tire according to claim 1, wherein each of said spikes has a diameter less than about 0.07 inches (1.78 mm.).

11. The device for preparing a racing tire according to claim 10, wherein each of said spikes has a length of less than about 0.20 inches (5.1 mm.).

12. The device for preparing a racing tire according to claim 1, wherein each of said spikes has a length of less than about 0.20 inches (5.1 mm.).

13. The device for preparing a racing tire according to claim 1, further comprising means for heating said plurality of spikes to facilitate penetration of the tire.

14. A device for preparing the tread surface of a racing tire to reduce blistering, the device comprising:

a frame configured to support a tire for rotation relative to said frame, said frame including an upper plate defining an underside including side edges configured to be supported on the ground;

a plurality of spikes projecting upwardly from said upper plate when said frame is on the ground so each of said plurality of spikes penetrates the tire as the tire is rolled across said upper plate, said plurality of spikes being spaced along a distance that is at least equal to the outer circumference of the tire, and along a width perpendicular to said distance that is substantially equal to the width of the tire;

means for heating said plurality of spikes to facilitate penetration of the tire, said means for heating including an electrically powered heating element in thermal contact with each of said plurality of spikes underneath said upper plate; and a backing plate disposed within said edges of said underside of said upper plate and under said heating element to provide support to said plurality of spikes and said heating element.

15. The device for preparing a racing tire according to claim 14, wherein said plurality of spikes are arranged in at least fifty (50) rows along said length.

16. The device for preparing a racing tire according to claim 15, wherein said plurality of spikes includes at least fifty (50) spikes in each of said rows.

17. The device for preparing a racing tire according to claim 14, wherein said plate includes two components connectable by a hinge, whereby said plate can be folded together about said hinge.

* * * * *